(12) United States Patent
Adachi

(10) Patent No.: US 9,725,009 B2
(45) Date of Patent: Aug. 8, 2017

(54) SHOVEL

(71) Applicant: SUMITOMO HEAVY INDUSTRIES, LTD., Tokyo (JP)

(72) Inventor: Shuntaro Adachi, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 125 days.

(21) Appl. No.: 14/629,116

(22) Filed: Feb. 23, 2015

(65) Prior Publication Data

US 2015/0245527 A1    Aug. 27, 2015

(30) Foreign Application Priority Data

Feb. 24, 2014   (JP) ................. 2014-032658

(51) Int. Cl.
*E01C 19/38*   (2006.01)
*B60L 11/18*   (2006.01)

(52) U.S. Cl.
CPC ....... *B60L 11/1874* (2013.01); *B60L 11/1879* (2013.01); *B60L 2200/40* (2013.01); *B60L 2240/545* (2013.01); *B60L 2270/145* (2013.01); *Y02T 10/7005* (2013.01); *Y02T 10/705* (2013.01)

(58) Field of Classification Search
CPC ....... G01F 1/8418; E02D 3/074; E01C 19/38; Y10T 74/1257

USPC ......................................... 404/117
See application file for complete search history.

(56) References Cited

U.S. PATENT DOCUMENTS

| | | | | |
|---|---|---|---|---|
| 4,282,938 A | * | 8/1981 | Minamidate | B25D 17/043 173/162.2 |
| 4,940,914 A | * | 7/1990 | Mizuno | G12B 3/08 310/316.01 |
| 8,727,660 B2 | * | 5/2014 | Anderegg | E02D 3/074 404/117 |
| 2007/0299589 A1 | * | 12/2007 | Gianoglio | E02F 9/2207 701/50 |
| 2012/0055689 A1 | * | 3/2012 | Wierer | B25D 17/043 173/162.2 |
| 2012/0234613 A1 | * | 9/2012 | Miyatake | E02F 9/0858 180/65.1 |

FOREIGN PATENT DOCUMENTS

JP   2012-021396 A   2/2012

* cited by examiner

*Primary Examiner* — Bickey Dhakal
(74) *Attorney, Agent, or Firm* — Squire Patton Boggs (US) LLP

(57) ABSTRACT

An electric motor is mounted on a body. The electric motor is driven by an electric driving unit. The electric driving unit is supported to the body by a vibration-proofing member. A natural frequency of a spring-mass system including the vibration-proofing member and the electric driving unit is higher than a frequency of a main component in vibration generated in the body during an operation.

6 Claims, 9 Drawing Sheets

SHOVEL

RELATED APPLICATION

Priority is claimed to Japanese Patent Application No. 2014-032658, filed Feb. 24, 2014, the entire content of which is incorporated herein by reference.

BACKGROUND

Technical Field

Certain embodiments of the invention relate to a shovel which includes an electric motor and an electric driving unit which drives the electric motor.

Description of Related Art

The related art discloses a hybrid hydraulic shovel. In the hybrid hydraulic shovel disclosed in the related art, a capacitor module which accumulates electric power supplied to an electric assist motor or the like is supported by a vibration-proofing rubber. The capacitor module is supported by the vibration-proofing rubber, and thus, it is possible to ensure reliability and durability of the capacitor module.

SUMMARY

According to a certain embodiment of the invention, there is provided a shovel including: a body; an electric motor which is mounted on the body; an electric driving unit which drives the electric motor; and a vibration-proofing member which supports the electric driving unit to the body, in which a natural frequency of a spring-mass system including the vibration-proofing member and the electric driving unit is higher than a frequency of a main component in vibration generated in the body during an operation.

DETAILED DESCRIPTION

Since a shovel performs many operations on a rugged ground, a body of the shovel is largely vibrated during the operation. In addition, due to distinctiveness of the operation such as digging, swiveling, or leveling, the vibration is easily generated in the body. The vibrations exerts an adverse effect on a precision part mounted on the shovel, for example, an electric driving unit such as a power storage device, and thus, the precision part may fail. In order to decrease the influence of the vibration applied to the precision part, a structure which supports the precision part by a vibration-proofing rubber or the like is suggested.

In general, in order to decrease the influence of the vibration applied to the precision part, a natural frequency of a spring-mass system including the vibration-proofing rubber and the precision part is set as low as possible. The natural frequency of the spring-mass system is set so as to be lower than a frequency of the vibration component having large amplitude generated in the body of the shovel. In order to decrease the natural frequency of the spring-mass system, a soft vibration-proofing rubber should be used. However, if the soft vibration-proofing rubber is used, it is difficult to ensure sufficient durability of the vibration-proofing rubber itself.

Accordingly, it is desirable to provide a shovel capable of decreasing influence of the vibration to the electric driving unit while preventing a decrease in durability of a vibration-proofing member.

According to an embodiment described below, a natural frequency of a spring-mass system is set so as to be higher than a frequency of a main component in vibration generated in a body during an operation, and thus, it is possible to use a vibration-proofing member having high durability. In addition, it is also possible to decrease influence of the vibration to an electric driving unit to some extent.

Figure 1:
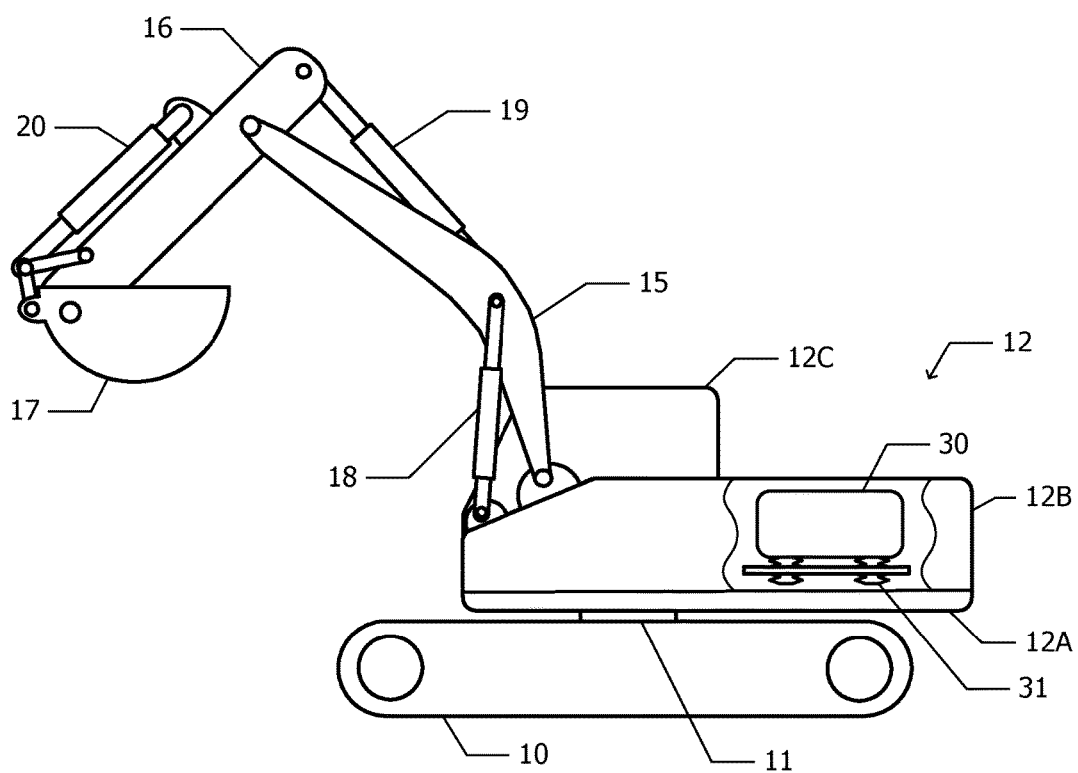
FIG. 1 is a partially cutaway side view of a shovel according to an embodiment.

FIG. 1 shows a partially cutaway side view of a shovel according to the embodiment. An upper swivel body (body) 12 is mounted on the lower travelling body 10 via a swiveling bearing 11. The upper swivel body 12 includes a swiveling frame 12A, a cover 12B, and a cabin 12C. The swiveling frame 12A functions as a support structure which supports the cabin 12C and various parts. The cover 12B covers various parts mounted on the swiveling frame 12A, for example, a power storage device 30. The power storage device 30 is supported by the swiveling frame 12A via a vibration-proofing member 31.

A swiveling motor swivels the swiveling frame 12A in a clockwise direction or a counterclockwise direction with respect to the lower travelling body 10. A boom 15, an arm 16, and a bucket 17 are attached to the upper swivel body 12. The boom 15, the arm 16, and the bucket 17 are hydraulically driven by a boom cylinder 18, an arm cylinder 19, and a bucket cylinder 20, respectively.

Figure 2A:
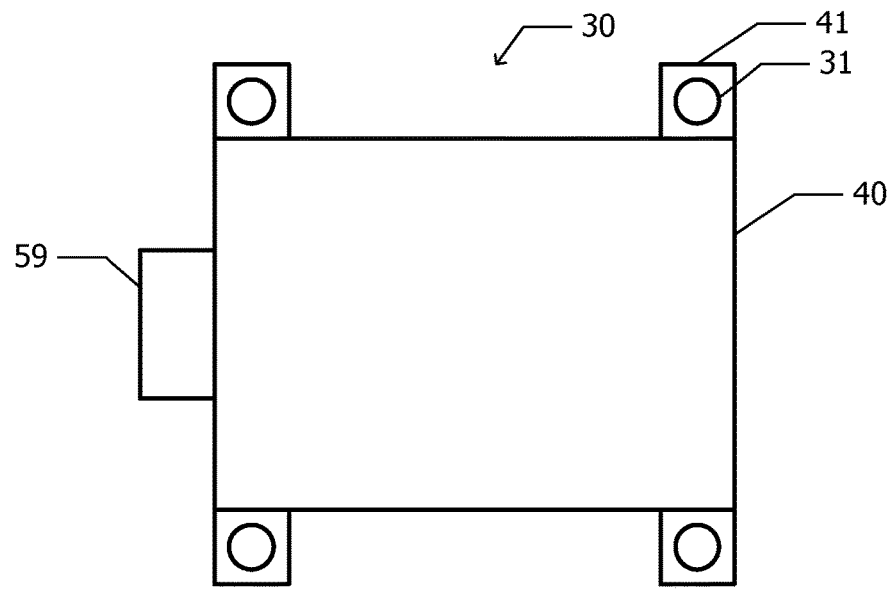
FIG. 2A is a plan view of a power storage device which is mounted on the shovel according to the embodiment.

FIG. 2A is a plan view showing the power storage device 30. Attachment legs 41 respectively extend from four corners of a case 40 having an approximately rectangular planar shape toward the outside. The vibration-proofing member 31 is attached to each of the attachment legs 41. The case 40 includes a connector box 59 which extends from the approximately center of one edge.

Figure 2B:
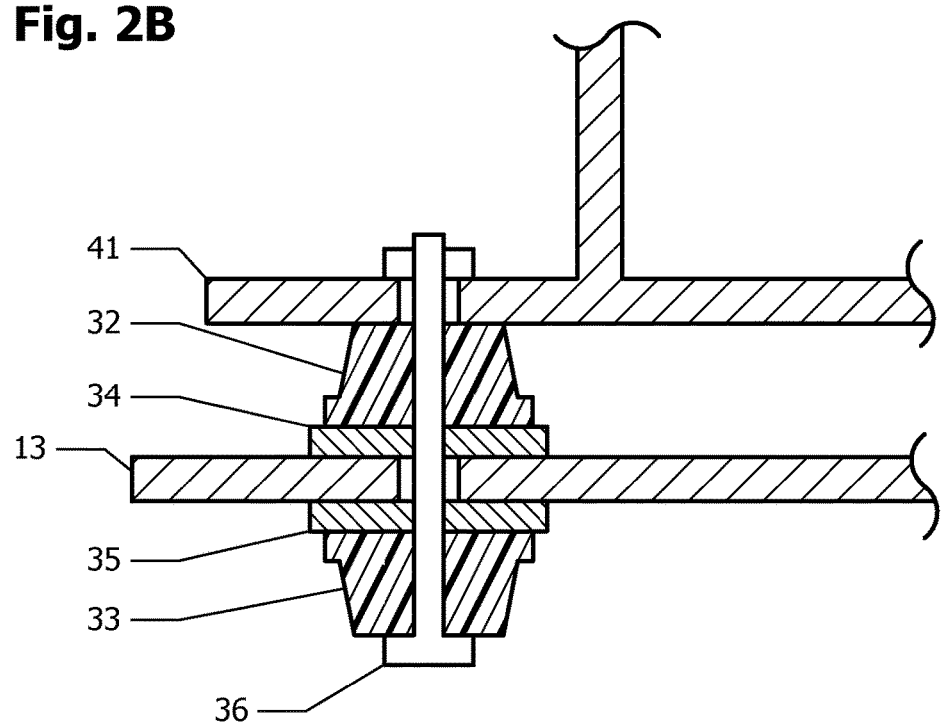
FIG. 2B is a cross-sectional view of a vibration-proofing member which supports the power storage device.

FIG. 2B is a cross-sectional view of the vibration-proofing member 31. The vibration-proofing member 31 includes an upper vibration-proofing rubber 32, a lower vibration-proofing rubber 33, an upper washer 34, a lower washer 35, and a fastener 36. The truncated conical upper vibration-proofing rubber 32 and the truncated conical lower vibration-proofing rubber 33 are respectively disposed above and below a support plate 13 fixed to the swiveling frame 12A (FIG. 1). The upper washer 34 is inserted between the upper vibration-proofing rubber 32 and the support plate 13, and the lower washer 35 is inserted between the lower vibration-proofing rubber 33 and the support plate 13. The attachment legs 41 of the case 40 are disposed on the upper vibration-proofing rubber 32. The fastener 36 penetrates the lower vibration-proofing rubber 33, the lower washer 35, the support plate 13, the upper washer 34, the upper vibration-proofing rubber 32, and the attachment leg 41, and fastens these. The attachment leg 41 is supported to the support plate 13 by the vibration-proofing member 31.

Figure 3:
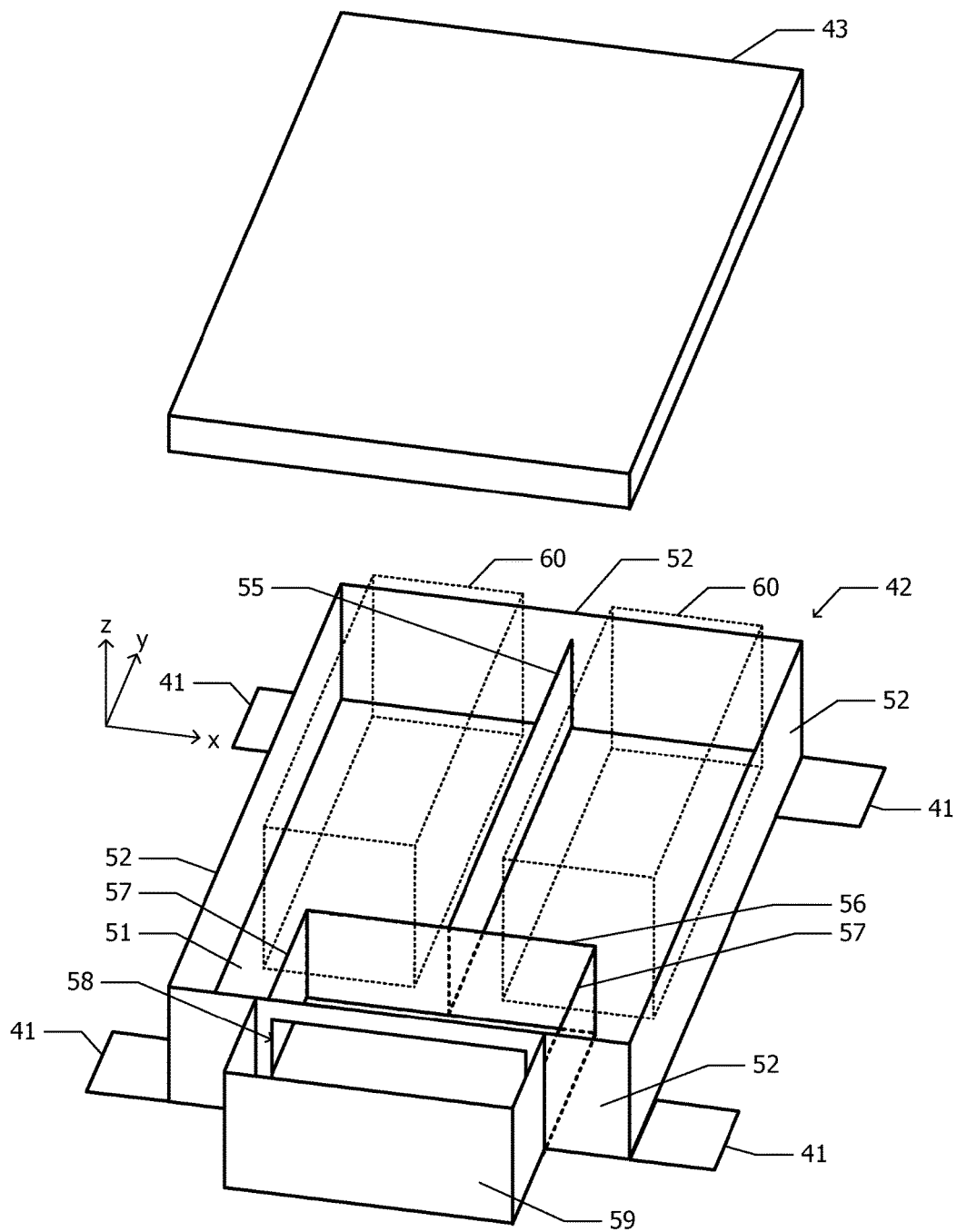
FIG. 3 is an exploded perspective view of the power storage device.

FIG. 3 is an exploded perspective view of the power storage device 30. The case 40 (FIG. 2A) includes a lower housing 42 in which the upper portion is opened, and a lid 43 which covers an opening portion of the lower housing 42. The lower housing 42 includes a bottom plate 51 and side plates 52. The side plates 52 are disposed over the entire region of an outer peripheral line of the bottom plate 51. The case 40 including the bottom plate 51, the side plates 52, and an upper plate are configured by the lower housing 42 and the lid 43.

Two power storage modules 60 are mounted on the bottom plate 51. An xyz rectangular coordinate system is defined in which a plane parallel to the bottom plate 51 is set as an xy plane, and a vertical direction of the bottom plate 51 is set as a z direction. A direction in which two power storage module 60 are away from each other is set as an x direction. Each of the power storage modules 60 include a plurality of power storage cells stacked in the y direction, and performs charging and discharging of electric energy. The detailed configuration of the power storage module 60 will be described with reference to FIGS. 5A and 5B below.

The connector box 59 is provided on one side plate 52 perpendicular to the y direction. A space inside the connector box 59 is connected to a space inside the lower housing 42 via an opening 58. An opening portion above the connector box 59 is covered by a connector plate on which a connector terminal is disposed.

A first rib 55, a second rib 56, and third ribs 57 are formed on the bottom plate 51 in order to increase stiffness. The first rib 55 is disposed between the two power storage modules 60 and extends in the y direction. One end of the first rib 55 is continued to the side plate 52 opposite to the side plate 52 on which the connector box 59 is provided.

The second rib 56 is connected to the end of the first rib 55, and extends in two directions parallel to the x direction. The first rib 55 is connected to the center of the second rib 56. The third ribs 57 extend in the y direction from both ends of the second rib 56, and reach the side plate 52 on which the connector box 59 is provided. The opening 58 is formed between locations at which two third ribs 57 are connected to the side plate 52.

On the basis of the bottom plate 51, the first rib 55, the second rib 56, and the third ribs 57 are lower than the side plate 52. In a state where the opening portion of the lower housing 42 is closed by the lid 43, gaps are formed between the first rib 55 and the lid 43, between the second rib 56 and the lid 43, and between the third ribs 57 and the lid 43.

The attachment legs 41 respectively extend toward the outside from each of four corners of the bottom plate 51. The bottom plate 51, the side plates 52, the first rib 55, the second rib 56, the third rib 57, the connector box 59, and the attachment legs 41 are integrally molded by casting. For example, as the materials of these, aluminum is used.

Figure 4:
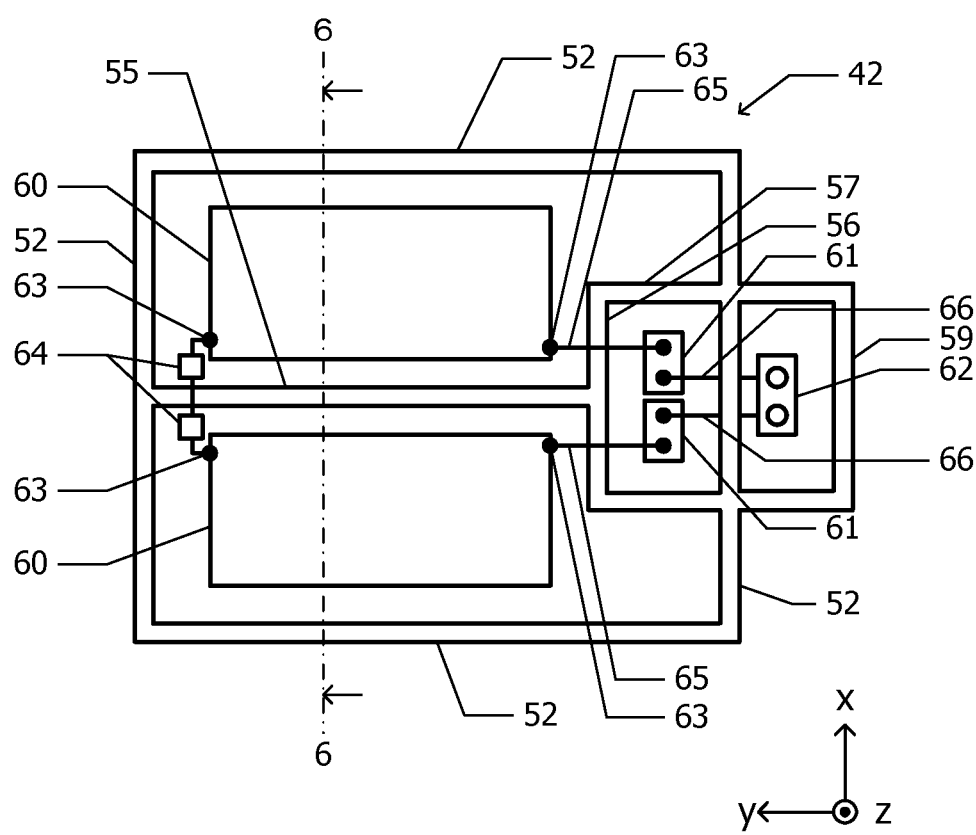
FIG. 4 is a plan view of a lower housing of the power storage device and parts mounted on the lower housing.

FIG. 4 is a plan view of the lower housing 42 and parts mounded on the lower housing 42. The two power storage modules 60 are mounted so as to be separated from each other in the x direction. The first rib 55 passes between the regions, on which the two power storage modules 60 are mounted, in the y direction. One end of the first rib 55 is continued to the side plate 52. The other end of the first rib 55 is positioned outside the end of the power storage module 60 with respect to the y direction. The second rib 56 extends in two directions parallel to the x direction from the end. The second rib 56 is partially overlapped with each of the power storage modules 60 with respect to the x direction. The third ribs 57 extend in the y direction from both ends of the second rib 56, and reach the side plate 52 on which the connector box 59 is provided.

A pair of relay members 61 is disposed in a region which is surrounded by the second rib 56, the third ribs 57, and the connector box 59. A relay circuit 62 is disposed inside the connector box 59. Each of the power storage modules 60 includes terminals 63 on both ends in the y direction. The charging and discharging of the power storage modules 60 are performed through the terminals 63. The terminals 63 far from the connector box 59 are electrically connected to each other via an electric-circuit part 64 including a fuse, a safety switch, or the like.

Each of the terminals 63 near the connector box 59 is electrically connected to the relay member 61 by a bus bar 65. The bus bar 65 intersects with the second rib 56. The relay member 61 is connected to the relay circuit 62 by a bus bar 66. The bus bar 66 passes through the opening 58 (FIG. 3).

Figure 5A:
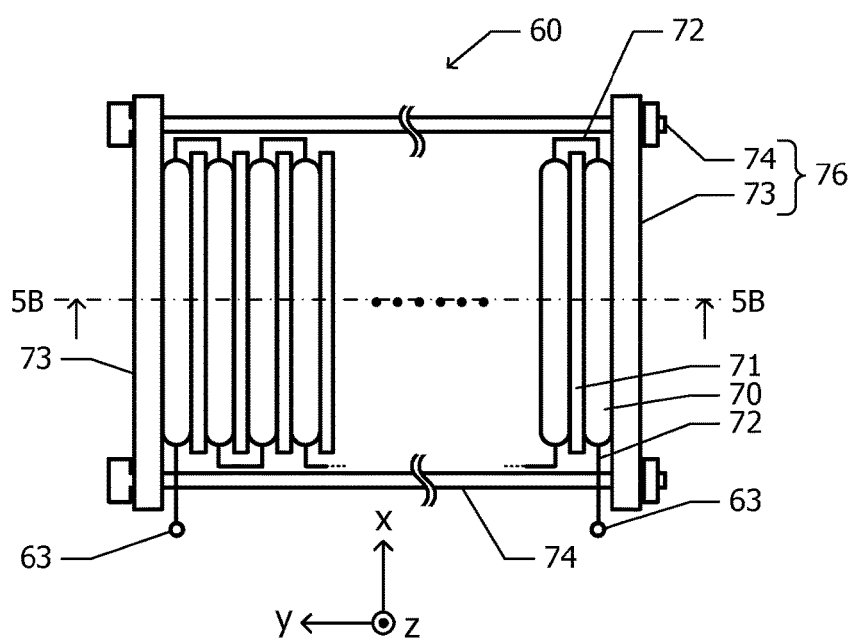
FIG. 5A is a plan view of a power storage module.

FIG. 5A is a plan view of the power storage module 60. Plate shaped power storage cells 70 and heat transfer plates 71 are alternately stacked with one another in the thickness direction (y direction). Moreover, one heat transfer plate 71 may be disposed with respect to a plurality of, for example, two power storage cells 70. A pair of electrode tabs 72 is drawn from each of the power storage cells 70. The pair of electrode tabs 72 is drawn in the x direction and in the directions opposite to each other. The electrode tabs 72 of the power storage cells 70 adjacent to each other are connected to each other, and thus, the plurality of power storage cells 70 are connected to one another in series. The electrode tabs 72 of the power storage cells 70 in both ends correspond to two terminals 63 (FIG. 4) of the power storage module 60.

A pressurizing mechanism 76 applies a compressive force in the stacking direction to the stacked structure in which the power storage cells 70 and the heat transfer plates are stacked. The pressurizing mechanism 76 includes pressurizing plates 73 disposed on both ends of the stacked structure, and a plurality of tie rods 74 which reach from one pressurizing plate 73 to the other pressurizing plate 73. By fastening the tie rods 74 with nuts, it is possible to apply the compressive force in the stacked direction to the stacked structure including the power storage cells 70 and the heat transfer plates 71.

Figure 5B:
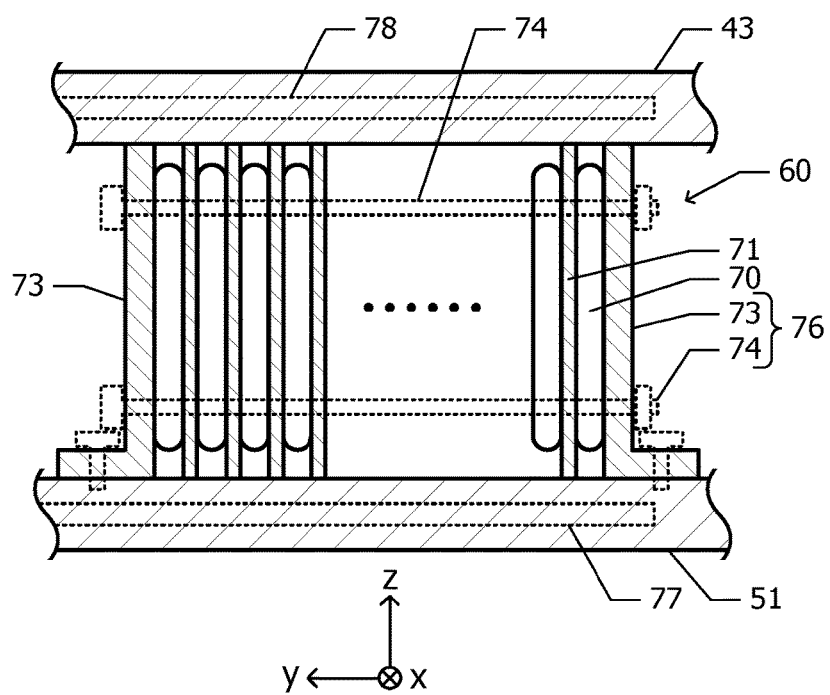
FIG. 5B is a cross-sectional view taken along a dashed line 5B-5B of FIG. 5A.

FIG. 5B is a cross-sectional view taken along a dashed line 5B-5B of FIG. 5A. The pressurizing plate 73 is screwed to the bottom plate 51 of the lower housing 42. The lower end of the heat transfer plate 71 comes into contact with the bottom plate 51, and the upper end comes into contact with the lid 43. The lid 43 is fastened to the lower housing 42 by bolts or the like and is fixed to the lower housing, and applies a compressive force in the z direction to the heat transfer plates 71. By the compressive force, the power storage module 60 is strongly fixed so as to be not movable to the inside of the case 40 including the lower housing 42 (FIG. 3) and the lid 43 (FIG. 3).

A flow path 77 for a cooling medium is formed inside the bottom plate 51, and a flow path 78 for the cooling medium is also formed inside the lid 43. The cooling medium, for example, cooling water, is circulated through the flow paths 77 and 78, and thus, it is possible to cool the power storage cells 70 via the heat transfer plates 71.

Figure 6:
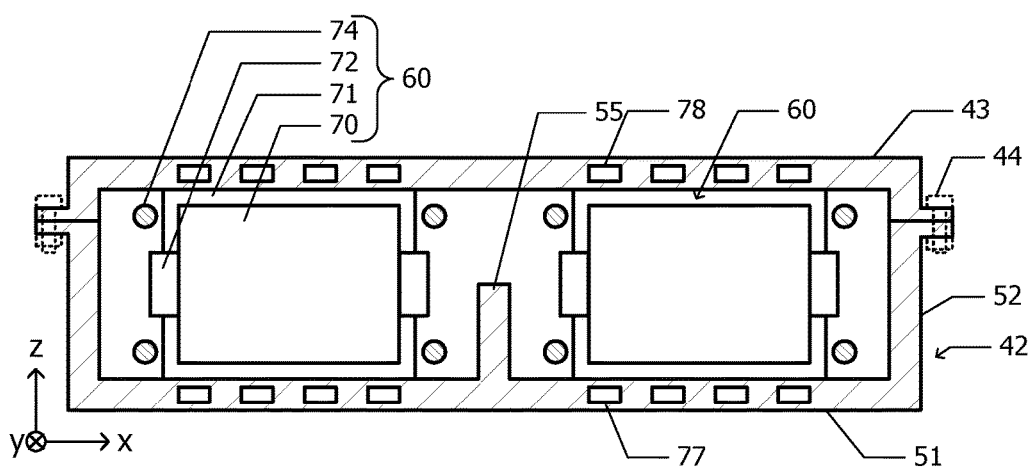
FIG. 6 is a cross-sectional view taken along a dashed line 6-6 of FIG. 4.

FIG. 6 is a cross-sectional view taken along a dashed line 6-6 of FIG. 4. The first rib 55 is formed at approximately the center of the bottom plate 51 with respect to the x direction. The power storage modules 60 are mounted on both sides of the first rib 55. The opening portion of the lower housing 42 is closed by the lid 43. The lid 43 is fixed to the lower housing 42 by a fastener 44 such as a bolt or a nut. The flow path 77 is formed inside the bottom plate 51, and the flow path 78 is formed inside the lid 43. Since the lower housing 42 and the lid 43 apply the compressive force in the z direction to the heat transfer plates 71, the two power storage modules 60 are fixed to the inside of the case 40.

Figure 7:
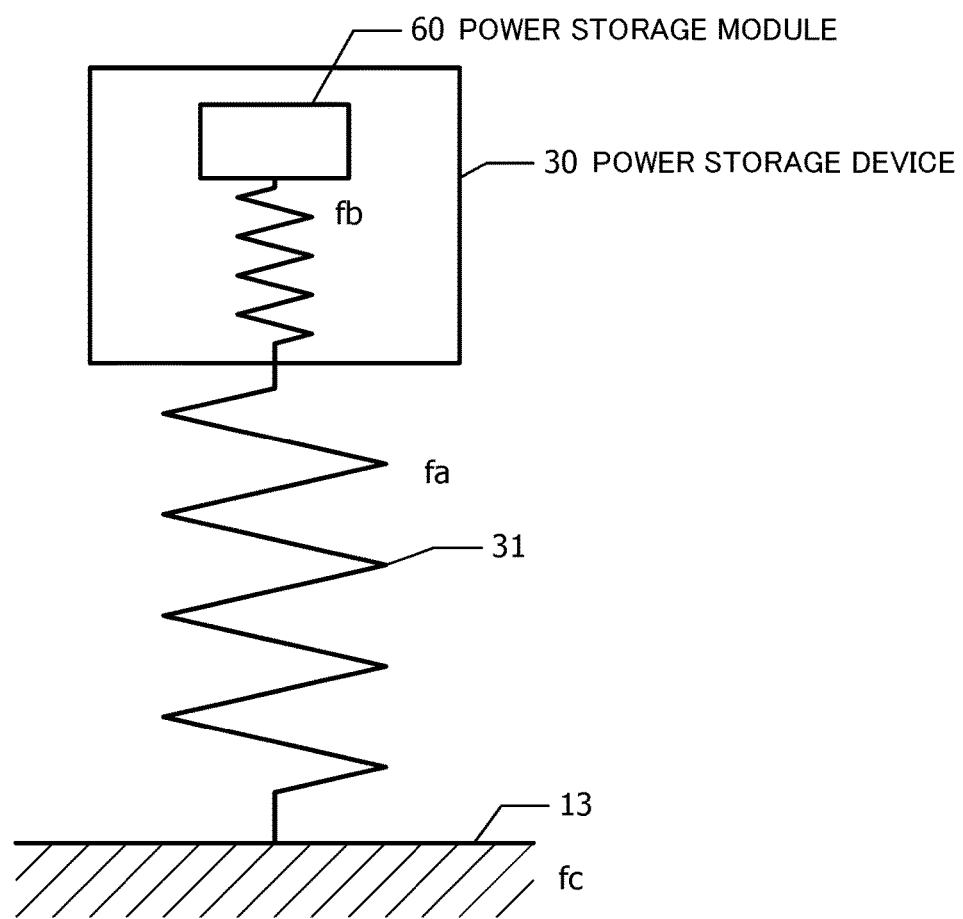
FIG. 7 is a schematic diagram of a member related to vibration of the power storage device.

FIG. 7 is a schematic diagram of members related to vibration of the power storage device 30. The power storage device 30 is supported to the support plate 13 by the vibration-proofing member 31. One spring-mass system is configured by the vibration-proofing member 31 and the power storage device 30. The spring-mass system has a natural frequency fa which is determined by a spring constant of the vibration-proofing member 31 and mass of the power storage device 30. Each electric part configuring the power storage device 30, for example, the power storage module 60 itself, has a certain natural frequency fb.

For example, the natural frequency fb in a falling mode of the heat transfer plate 71 configuring the power storage module 60 shown in FIG. 5B is approximately 130 Hz. The natural frequency fb in the falling mode of the heat transfer plate 71 is the lowest frequency among the natural frequencies in various vibration modes of various electric parts inside the power storage device 30.

During the operation of the shovel (FIG. 1), the swiveling frame 12A and the support plate 13 fixed to the swiveling frame 12A are vibrated. Various operations were performed by the shovel, a spectrum of the vibration waveform was observed, and thus, it was found that the amplitude in a waveform component of approximately 20 Hz is great. That is, it was understood that a frequency fc in a main component of the vibration is approximately 20 Hz. Here, the "main component of vibration" means a component having the frequency of a band at which the greatest peak or climax appear in the spectrum of the vibration waveform.

Figure 8:
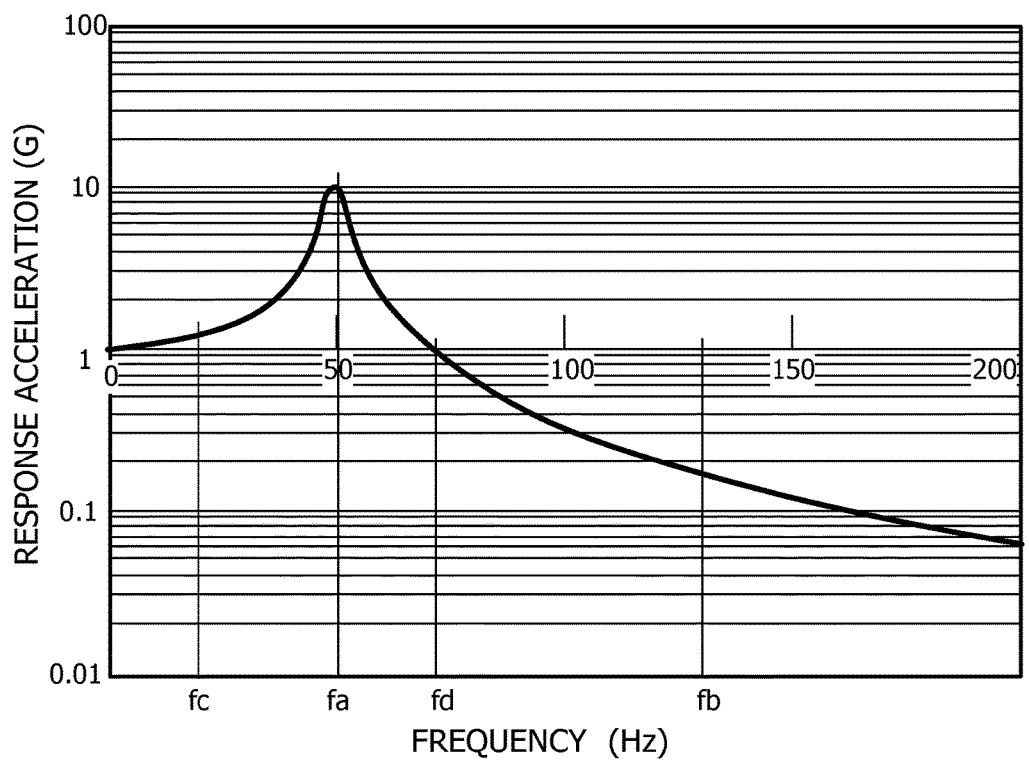
FIG. 8 is a graph showing a relationship between a frequency and a response acceleration when vibration having a maximum acceleration of 1G (G indicates gravitational acceleration) is applied to a spring-mass system from the outside.

FIG. 8 shows a relationship between a frequency and a response acceleration when vibration having a maximum acceleration of 1G (G indicates gravitational acceleration) is applied to a certain spring-mass system from the outside. A horizontal axis represents the frequency of the vibration applied from the outside by a unit "Hz", and a vertical axis represents a value in which the maximum value of the acceleration applied to an object having mass is normalized by gravitational acceleration G.

As the frequency is increased from 0, the response acceleration is gradually increased from 1G and reaches the maximum at the natural frequency fa of the spring-mass system. In the region in which the frequency is higher than the natural frequency fa, the response acceleration is decreased as the frequency is increased and thus, the response acceleration is decreased to 1G at the frequency fd (hereinafter, referred to as a "reference frequency"). In the region in which the frequency is higher than the reference frequency fd, the response acceleration is lower than 1G. That is, a damping effect is obtained.

In general, the natural frequency fa of the spring-mass system is set so that the reference frequency fd is lower than the frequency fc of the main component of the external vibration. By setting the natural frequency fa of the spring-mass system in this way, it is possible to obtain the damping effect in the vicinity of the frequency fc of the main component of the external vibration.

However, when the frequency fc of the main component of the external vibration is as low as approximately 20 Hz, in order to make the natural frequency fa be lower than the frequency fc, the spring constant of the spring-mass system should be decreased. When a vibration-proofing rubber is used for the vibration-proofing member 31, a soft vibration-proofing rubber should be used. When the soft vibration-proofing rubber is used, the durability of the vibration-proofing member 31 itself is decreased, and thus the soft vibration-proofing rubber may not be realistically used for the shovel.

In the embodiment, the natural frequency fa of the spring-mass system is designed so as to be higher than the frequency fc of the main component of the external vibration. Moreover, the natural frequency fa of the spring-mass system is designed so as to be lower than the natural frequency fb which is lowest among the natural frequencies of various electric parts inside the power storage device 30. The spring-mass system can be designed so that the reference frequency fd is lower than the natural frequency fb.

When the spring-mass system is designed as described above, the damping effect is obtained in the vicinity of the natural frequency fb which is lowest among the natural frequencies of the various electric parts inside the power storage device 30. In a range in which the frequency is higher than the natural frequency fb, a greater damping effect is obtained. Accordingly, it is possible to obtain the damping effect in the natural frequencies of all electric parts inside the power storage device 30.

Since the natural frequency fa of the spring-mass system is higher than the frequency fc of the main component of the external vibration, compared to when the natural frequency fa of the spring-mass system is lower than the frequency fc, it is possible to use the vibration-proofing rubber having higher durability in the vibration-proofing member 31 (FIG. 2B).

In the embodiment, in the frequency fc of the main component of the external vibration, the response acceleration is greater than 1G. However, since the natural frequencies of various electric parts inside the power storage device 30 are sufficiently higher than the frequency fc of the main component of the external vibration, the power storage device 30 has sufficiently high vibration resistance in the vicinity of the frequency fc. Accordingly, even when the damping effect is not obtained in the vicinity of the frequency fc, there is almost no adverse effect exerted to the power storage device 30.

The response acceleration is significantly greater than 1G in the vicinity of the natural frequency fa of the spring-mass system. However, the amplitude of the component of the external vibration having the frequency in the vicinity of the natural frequency fa is small. In addition, the power storage device 30 has sufficiently high vibration resistance in the vicinity of the natural frequency fa. Accordingly, even when the response acceleration is increased in the vicinity of the natural frequency fa, there is almost no adverse effect exerted to the power storage device 30.

Next, a preferable range of the natural frequency fa of the spring-mass system will be described. The reference frequency fd is approximately 1.4 times the natural frequency fa. In order to make the reference frequency fd be lower than the natural frequency fb which is lowest among the natural frequencies of various electric parts inside the power storage device 30, the natural frequency fa can be set so that the natural frequency fa of the spring-mass system and the natural frequency fb satisfy the following relationship:

$$fa < fb/1.4.$$

In the case of the embodiment, since the natural frequency fb is approximately 130 Hz, the natural frequency fa of the spring-mass system can be lower than 92 Hz. In order to allow a margin, the natural frequency fa of the spring-mass system can be lower than 80 Hz.

If the natural frequency of the spring-mass system approaches the frequency fc in the main component of the external vibration, the vibration of the power storage device 30 is increased, and thus, there is a risk that the vibration is excessive. In order to avoid the risk, the natural frequency fa can be equal to or higher than 1.5 times the frequency fc in the main component of the external vibration. In the case of the embodiment, since the frequency fc in the main component of the external vibration is approximately 20 Hz, the natural frequency fa of the spring-mass system can be equal to or higher than 30 Hz.

The above-described preferable range of the natural frequency fa can be applied to the natural frequency fa in the three directions orthogonal to one another.

Figure 9:
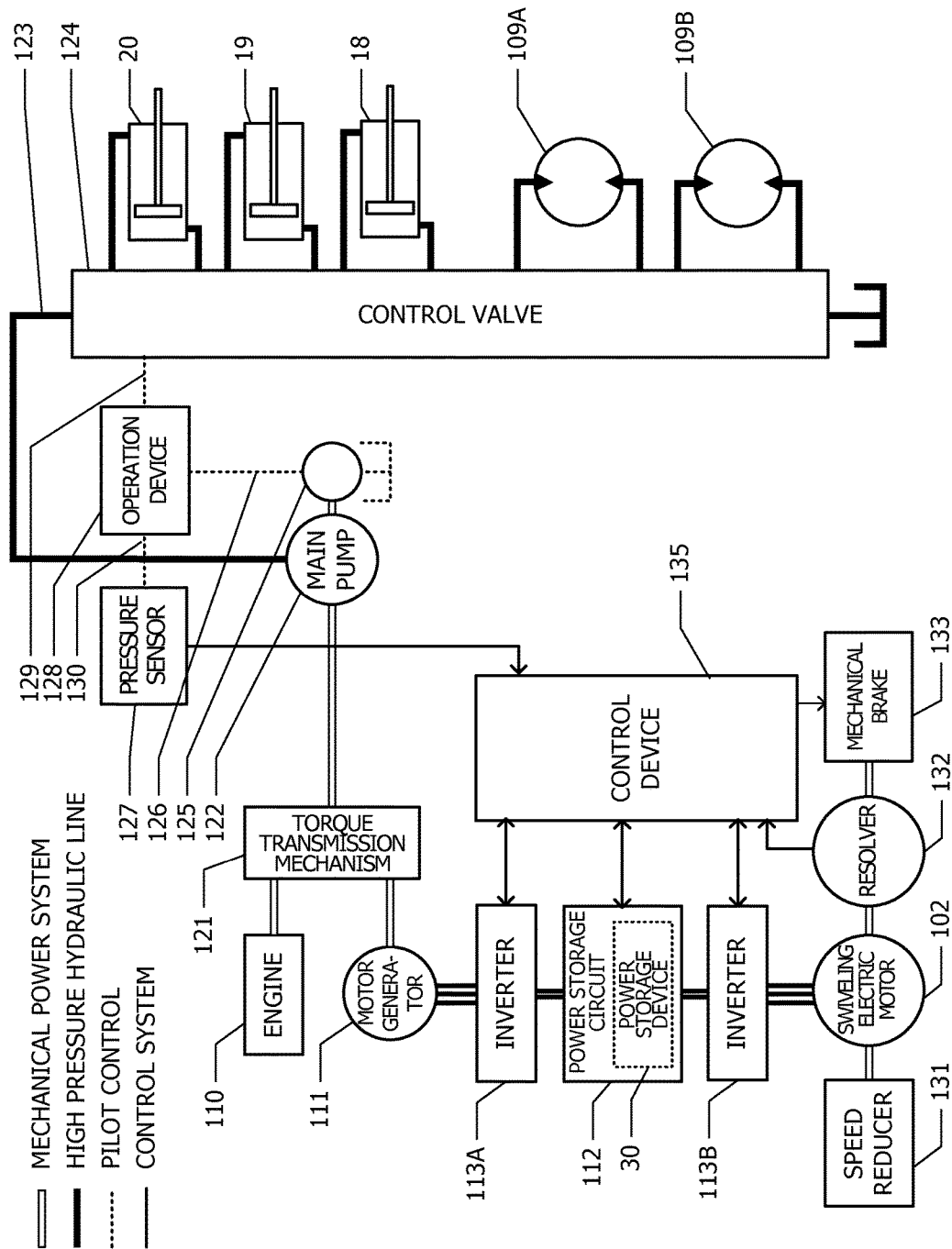
FIG. 9 is a block diagram of the shovel according to the embodiment.

FIG. 9 is a block diagram of the shovel according to the embodiment. In FIG. 9, a mechanical power system is indicated by a double line, a high pressure hydraulic line is indicated by a thick solid line, an electric control system is indicated by a thin solid line, and a pilot line is indicated by a dashed line.

A drive shaft of an engine 110 is connected to an input shaft of a torque transmission mechanism 121. As the engine 110, an engine which generates a driving force by a fuel other than electricity, for example, an internal combustion engine such as a diesel engine, is used.

A drive shaft of a motor generator 111 is connected to another input shaft of the torque transmission mechanism 121. The motor generator 111 is adapted to perform both driving motions of an electric (assist) operation and a generating operation. The torque transmission mechanism 121 includes two input shafts and one output shaft. The output shaft is connected to a drive shaft of a main pump 122.

When a load applied to the main pump 122 is large, the motor generator 111 performs the assist operation, and thus, the driving force of the motor generator 111 is transmitted to the main pump 122 via the torque transmission mechanism 121. Accordingly, the load applied to the engine 110 is decreased. In contrast, when the load applied to the main pump 122 is small, the driving force of the engine 110 is transmitted to the motor generator 111 via the torque transmission mechanism 121, and thus, the motor generator 111 is operated to generate electricity.

The main pump 122 supplies a hydraulic pressure to a control valve 124 via a high pressure hydraulic line 123. According to a command of a driver, the control valve 124 distributes the hydraulic pressure to hydraulic motors 109A and 109B, the boom cylinder 18, the arm cylinder 19, and the bucket cylinder 20. The hydraulic motors 109A and 109B drive two right and left crawlers which are provided on the lower travelling body 10 (FIG. 1).

The motor generator 111 is connected to a power storage circuit 112 via an inverter 113A. A swiveling electric motor 102 is connected to the power storage circuit 112 via an inverter 113B. The inverters 113A and 113B and the power storage circuit 112 are controlled by a control device 135.

The inverter 113A controls the operation of the motor generator 111 based on the command from the control device 135. Switching between the assist operation and the generating operation of the motor generator 111 is performed by the inverter 113A.

While the motor generator 111 performs the assist operation, the required electric power is supplied from the power storage circuit 112 to the motor generator 111 through the inverter 113A. While the motor generator 111 performs the generating operation, the electric power generated by the motor generator 111 is supplied to the power storage circuit 112 through the inverter 113A. Accordingly, the power storage device 30 in the power storage circuit 112 is charged. The power storage device according to the embodiment is used as the power storage device 30 in the power storage circuit 112.

The swiveling electric motor 102 is driven with alternating current by the inverter 113B, and is adapted to perform both operations of a powering operation and a regenerative operation. During the powering operation of the swiveling electric motor 102, electric power is supplied from the power storage circuit 112 to the swiveling electric motor 102 via the inverter 113B. The swiveling electric motor 102 swivels the upper swivel body 101 (FIG. 11) via a speed reducer 131. During the regenerative operation, the rotating motion of the upper swivel body 101 is transmitted to the swiveling electric motor 102 via the speed reducer 131, and thus, the swiveling electric motor 102 generates regenerative electric power. The generated regenerative electric power is supplied to the power storage circuit 112 via the inverter 113B. Accordingly, the power storage device 30 in the power storage circuit 112 is charged.

A resolver 132 detects the position in a rotation direction of a rotary shaft of the swiveling electric motor 102. The detected result of the resolver 132 is input to the control device 135. By detecting the position in the rotation direction of the rotary shaft before and after the swiveling electric motor 102 is operated, the swiveling angle and the swiveling direction are derived.

A mechanical brake 133 is connected to the rotary shaft of the swiveling electric motor 102 and generates a mechanical braking force. A braking state and a release state of the mechanical brake 133 are switched by an electromagnetic switch according to the control from the control device 135.

A pilot pump 125 generates a pilot pressure needed for a hydraulic operation system. The generated pilot pressure is supplied to an operation device 128 via a pilot line 126. The operation device 128 includes a pedal or a lever and is operated by the driver. The operation device 128 converts a primary hydraulic pressure supplied from the pilot line 126 into a secondary hydraulic pressure according to the operation of the driver. The secondary hydraulic pressure is transmitted to the control valve 124 via a hydraulic line 129, and is transmitted to a pressure sensor 127 via another hydraulic line 130.

The detected result of the pressure detected by the pressure sensor 127 is input to the control device 135. Accordingly, the control device 135 can detect conditions of the operations in the lower travelling body 10, the swiveling electric motor 102, the boom 15, the arm 16, and the bucket 17 (FIG. 1).

In the embodiment, the configuration for preventing the vibration of the power storage device 30 is described. In order to prevent the vibrations of other electric driving units, similar configuration can be also applied to the electric driving units. As the electric driving unit in which the vibration is to be prevented, there are inverters 113A and 113B or the like. In addition, as the electric driving unit in which the vibration is to be prevented, there are parts other than the power storage device 30 in the power storage circuit 112, for example, a step-up/step down converter for stepping up and stepping down the output of the power storage device 30, or the like.

It should be understood that the invention is not limited to the above-described embodiment, but may be modified into various forms on the basis of the spirit of the invention. Additionally, the modifications are included in the scope of the invention.

What is claimed is:

1. A shovel comprising:
   a body;
   an electric unit; and
   a vibration-proofing member which su orts the electric unit to the body,
   wherein a natural frequency of a spring-mass system which is determined by a spring constant of the vibration-proofing member and mass of the electric unit is higher than a frequency of a main component in vibration generated in the body during an operation, and
   wherein the electric unit includes:
   a case; and
   electric parts which are mounted on an inner portion of the case,
   wherein a lowest natural frequency of the electric parts among natural frequencies in various vibration modes of the electric parts is higher than the natural frequency of the spring-mass system including the vibration-proofing member and the electric unit.

2. The shovel according to claim 1,
   wherein the electric parts include a power storage module which accumulates electric power supplied to an electric motor from an electric power source.

3. The shovel according to claim 2,
   wherein the power storage module includes a stacked structure in which a plurality of plate-shaped power storage cells and a plurality of heat transfer plates are stacked and a compressive force is applied in a stacking direction by a pressurizing mechanism, and
   wherein a bottom plate and an upper plate of the case fix the power storage module to the inside of the case by applying the compressive force in a direction orthogonal to the stacking direction to the stacked structure.

4. The shovel according to claim 3,
   wherein the natural frequency of the spring-mass system including the vibration-proofing member and the electric unit is within a range of 30 Hz to 80 Hz.

5. The shovel according to claim 3, wherein the natural frequency of the spring-mass system including the vibration-proofing member and the electric unit is within a range of 30 Hz to 80 Hz applied in three directions orthogonal to one another.

6. The shovel according to claim 2, further comprising an electric motor which is mounted on the body, the electric motor being driven by the electric unit.

* * * * *